United States Patent [19]
Luthi et al.

[11] Patent Number: 5,708,665
[45] Date of Patent: Jan. 13, 1998

[54] DIGITAL RECEIVER USING EQUALIZATION AND BLOCK DECODING WITH ERASURE AND ERROR CORRECTION

[75] Inventors: Daniel A. Luthi, San Jose; Ravi Bhaskaran, Santa Clara; Dojun Rhee, San Jose; Advait M. Mogre, Fremont, all of Calif.

[73] Assignee: LSI Logic Corporation, Milpitas, Calif.

[21] Appl. No.: 701,710

[22] Filed: Aug. 22, 1996

[51] Int. Cl.⁶ .................................................. G06F 11/00
[52] U.S. Cl. ............................ 371/5.1; 371/41; 371/45; 371/39.1; 375/229
[58] Field of Search ......................... 371/5.1, 41, 43, 371/44, 45, 37.1, 38.1, 39.1; 375/224, 229, 233, 262, 265, 266

[56] References Cited

U.S. PATENT DOCUMENTS 4,829,525  5/1989  Sugiyama et al. ................. 371/38
5,430,743  7/1995  Marturano et al. ................ 371/43

*Primary Examiner*—Phung Chung
*Attorney, Agent, or Firm*—Kevin L. Daffer; Conley, Rose & Tayon

[57] ABSTRACT

A communications receiver system is presented for detecting burst errors and providing erasure information to the block decoder (outer decoder), thereby effectively doubling the conventional correction capability of the block decoder with only a minimal increase in complexity. In one embodiment, this mechanism takes the form of a circuit which re-encodes the output of the inner decoder, compares it with the received sequence of code symbols, and flags a portion of the inner decoder output for erasure when an excessive number of code symbol errors are detected. In a second embodiment, this mechanism takes the form of a circuit which makes hard symbol decisions on the channel signal, compares the hard decisions to the channel signal to determine a noise level, and thereafter flags the channel output in regions with excessive noise levels.

14 Claims, 4 Drawing Sheets

DIGITAL RECEIVER USING EQUALIZATION AND BLOCK DECODING WITH ERASURE AND ERROR CORRECTION

BACKGROUND OF THE INVENTION

1. Field of the Invention

This invention relates to the field of digital communication systems such as those that might be used for satellite transmission channels and cable channels, and in particular to the decoding of error correction coded signals.

2. Description of the Relevant Art

The history of error correction coding begins in 1948 with Claude Shannon. Shannon demonstrated that any communications channel has a calculable capacity such that information transmission at a rate which does not exceed the capacity can be achieved with as small an error rate as desired. This information transmission is accomplished via the use of error correction coding. Unfortunately, Shannon's proof was based on ensemble averages, and consequently did not provide a useful code construction technique. During the 1950's, an extensive amount of effort was put into developing explicit code constructions which would provide asymptotically vanishing error rates, without success. The class of Hamming codes was introduced in 1950, but these block codes were only capable of correcting single errors. Other codes were developed in the 1950's, but they were accompanied by no general construction theory. In the late 1950's, a probabilistic approach to the decoding problem led to the development of tree codes, which have been primarily represented by convolutional codes. Then around 1960, Reed-Solomon codes and the more general Bose-Chadhuri-Hocquenghem codes provided a large class of multiple error correcting codes, which comprise one of the most important classes of block codes today. However, the performance of these codes suffers when extended to large block lengths. In 1967, the invention of the Viterbi decoder provided a replacement for the sequential decoding of tree codes, thereby strengthening the feasibility of convolutional coding. Finally, in the 1970's the Justesen and Goppa code families were introduced which provided good codes with long block lengths.

Error control codes function by accepting input data symbols and processing them in such a way as to add some redundancy to the symbol sequence. All error control codes can be formulated so that this coding process takes the form of adding check symbols to the data symbol sequence. With this formulation, the encoder accepts an input word of k data symbols at each time step and produces a code word with n symbols, k of which are the input data symbols, and n-k of which are the check symbols. An example of such a code word 10 having k data symbols 12 and n-k check symbols 14 is shown in FIG. 1. The redundancy added by the check symbols serves to increase the distance between valid code symbol sequences. A common measure of the distance between code words is the number of symbols in which they differ, defined herein as the Hamming distance. Shown in FIG. 2 are two code words 16 and 18 which are selected from the set of valid code words that make up an example block code. A comparison of two code words 16 and 18, shown in FIG. 2 reveals three symbol positions which differ: $D_3$, $D_5$, and $D_7$. Thus the Hamming distance between code words 16 and 18 is three. The minimum Hamming distance between any two sequences of code words is called the minimum Hamming distance of the code, and is often denoted $d_{min}^H$. For a block code, each code word is unrelated to other code words, so this distance corresponds to the minimum Hamming distance between any two code words. In FIG. 2, the code words 16 and 18 are the nearest valid code words, so for this code $d_{min}^H=3$.

When code words are transmitted across a noisy channel, they are often subject to corruption. This corruption typically takes the form of symbol errors in the code word. Usually the locations of these errors are unknown prior to decoding, but in some cases it is possible to determine the locations of these errors prior to decoding. When this occurs, it is advantageous to mark their locations in some manner so that these symbols are disregarded in the decoding process. When this is done, these errors which are characterized by an unknown error value but a known error location can be referred to as erasures. The circumstances under which the code word will be correctly decoded are provided by the following equation:

$$n_E + 2n_e \leq d_{min}^H - 1$$

where $n_E$ is the number of erasures and $n_e$ is the number of errors.

To illustrate the above equation, assume that code word 18 is transmitted and received as a corrupted code word 20 with two symbol errors. Consider the well known decoding algorithm wherein the received code word is compared to all valid code words, and the valid code word that is most like the received code word is chosen as the correct code word. Decoding is then accomplished by simply removing the check symbols from the chosen code word. In FIG. 2 code word 20 represents a received code word that contains two symbol errors. According to the equation, code word 20 may be incorrectly decoded, and indeed it differs by only one symbol from code word 16. According to the stated decoding algorithm, incorrect code word 16 is chosen, resulting in a decoding error. However, when the knowledge of the error locations is applied as shown by code word 22, then these symbols are ignored in the comparison process and code word 22 matches the correct code word 18. Consequently code word 22 with erasures is correctly decoded. In general, the number of erasures that a code can tolerate without making decision errors is twice the number of unerased errors that it can tolerate. Further details on the design and function of error correction codes may be found in Bernard Sklar, Digital Communications: Fundamentals and Applications, Prentice Hall, Englewood Cliffs N.J., pp. 263–365, 1988, incorporated herein by reference.

While this relation between error and erasure tolerance is well known, a practical mechanism for detecting error locations before decoding is not. The above equation shows that erasures and errors both impair the ability to decode correctly, and the only advantage gained by using erasures is the provision of additional side information to the decoder. When erasures are misapplied, that is, when the location of errors is misidentified, then decoding performance worsens.

The art of code design revolves around optimizing the tradeoff between rate reduction and Hamming distance gain for a given code complexity. Reed-Solomon codes are extremely popular because this family of codes is based on a construction that allows for custom tailoring of the information rate and Hamming distance properties of the code. Furthermore, efficient decoders are easy to design for these codes. However at large block lengths, the performance of Reed-Solomon codes suffers a loss of efficiency. A technique for extending the effective block length of these codes is to follow the Reed-Solomon encoder with an interleaver which acts to intersperse the symbols from one code word with the symbols from other code words. This is typically done by writing the code words into a memory matrix column-wise and reading the completed matrix row-wise. The interleaver can then be followed by a convolutional encoder which further adds redundancy to the symbol sequence. At the receiving end the process is reversed, first applying a convolutional decoder to the received sequence, next applying a de-interleaver, and finally performing the Reed-Solomon block decode. Each of the additional steps adds only a moderate amount of complexity to the system while significantly boosting its performance.

This arrangement is typically used in environments where code symbol errors caused by the channel tend to occur randomly or in bursts. Burst errors are not random isolated errors, but rather burst errors are defined as errors which occur in localized groups. For example, in the case of the satellite receiver system, the nature of the errors on the channel is typically random, although when a concatenated decoder is used, errors in convolutional decoding tend to be burst errors. A method for detecting bursts errors of the convolutional decoder would prove advantageous in assisting the following block decoder. Apart from the random noise, other effects may corrupt the transmitted signal. These effects are more bursty in nature (examples: microwave radiation close to the receiving antenna, lightning, home appliance electrical noise, etc.). The de-interleaver acts to distribute errors within a group so that they are isolated and fewer occur within a given code word. This in turn enhances the probability that the number of errors will not exceed the correction capability of the Reed-Solomon code. Nevertheless, it is still necessary to use Reed-Solomon codes of moderate length and complexity to keep the error correction capability high enough to preserve their resistance to burst errors.

Since error correction coding necessitates the transmission of check symbols in addition to the data symbols, the bandwidth available to the data symbols can be decreased to make room for the check symbols, or additional bandwidth can be allocated for the check symbols. The first option results in a reduction of the rate at which data can be transmitted, and the second option results in an increase in overall channel bandwidth. Typically one of these options is required, but the tradeoff is increased manufacturing tolerances, increased margin for equipment degradation, a reduction of the required signal-to-noise ratio, and an overall reduced probability of error.

SUMMARY OF THE INVENTION

The problems outlined above are in large part solved by a receiver with a mechanism for detecting burst errors and providing erasure information to the block decoder, thereby increasing the conventional correction capability of the block decoder with only a small increase in complexity. In one embodiment, a transmission system is provided having a transmission channel interposed between a concatenated encoder and concatenated decoder. The concatenated encoder has an outer block encoder followed by an interleaver followed by an inner convolutional encoder. The concatenated decoder has an inner convolutional decoder followed by a deinterleaver followed by a outer block decoder. The burst error detection mechanism takes the form of a circuit which re-encodes the output of the inner decoder, and compares it with the received sequence of code symbols, and flags a portion of the inner decoder output for erasure when a number of code symbol errors are detected in a given interval.

In a second embodiment a transmission system is provided having a transmission channel interposed between an encoder and a decoder. The burst error detection mechanism takes the form of a circuit which equalizes the signal, makes decisions based on the signal, forms a sequence of differences between the equalized signal and the decisions, and flags a portion of the decoder input signal for erasure when the estimated noise level meets one or more criteria in a given interval.

Broadly speaking, the present invention contemplates a digital communications system. The digital communications system comprises an encoder configured to receive a digital signal representing data for transmission. The encoder serves to convert the digital signal to a coded digital signal. The coded digital signal may then be sent through a transmission channel. An error detector is coupled to the receiving end of the transmission channel to receive the coded digital signal. The error detector determines errors in defined locations in the coded digital signal and sets a flag for those defined locations. A decoder is coupled to the receiving end of the transmission channel to receive the coded digital signal. The decoder is also coupled to receive output from the error detector indicative of the flag status. The decoder then decodes the coded digital sequence using the error location flags to increase its error correcting capability.

According to one embodiment, the decoder takes the form of a concatenated decoder in which the output of the inner decoder is coupled as a second input to the error detector, and the outer decoder is coupled to receive output from the error detector indicative of the flag status. The outer decoder then decodes the coded digital sequence using the error location flags to increase its error correcting capability.

According to a second embodiment, the error detector flags errors on the basis of estimated noise levels. The decoder is coupled to receive output from the error detector indicative of the flag status. The decoder then decodes the coded digital sequence using the error location flags to increase its error correcting capability.

BRIEF DESCRIPTION OF THE DRAWINGS

Other objects and advantages of the invention will become apparent upon reading the following detailed description and upon reference to the accompanying drawings in which.

Figure 1:
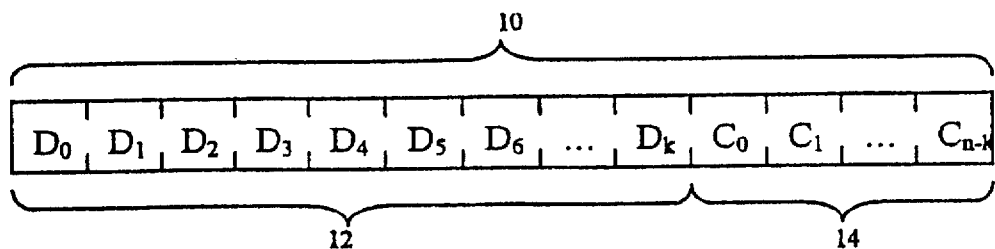
FIG. 1 is a code word comprising a structured sequence of data symbols and check symbols encoded according to a block and/or convolutional encoder.
Figure 2:
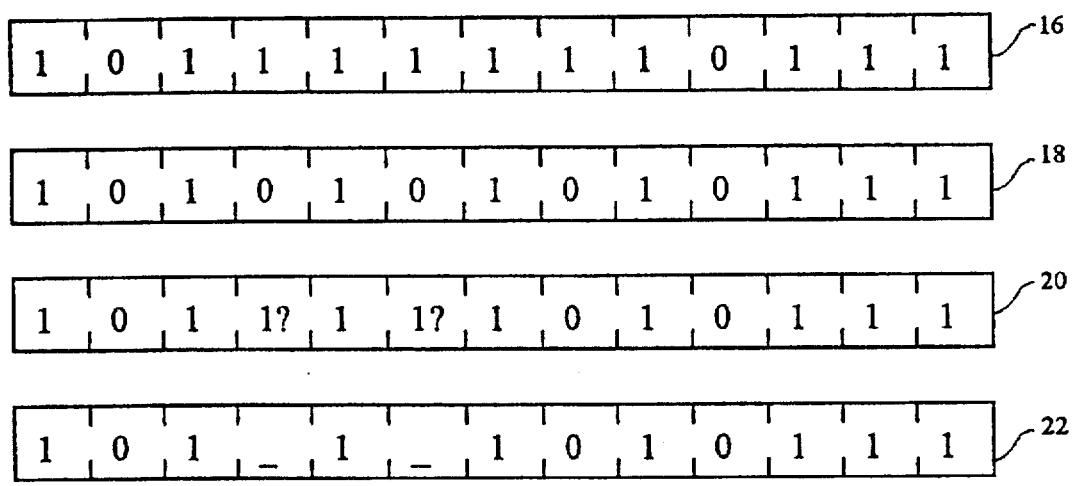
FIG. 2 is set of code words exemplifying a correct code word, an incorrect yet valid code word, a corrupted version of the correct code word with errors, and a corrupted version of the correct code word with erasures.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
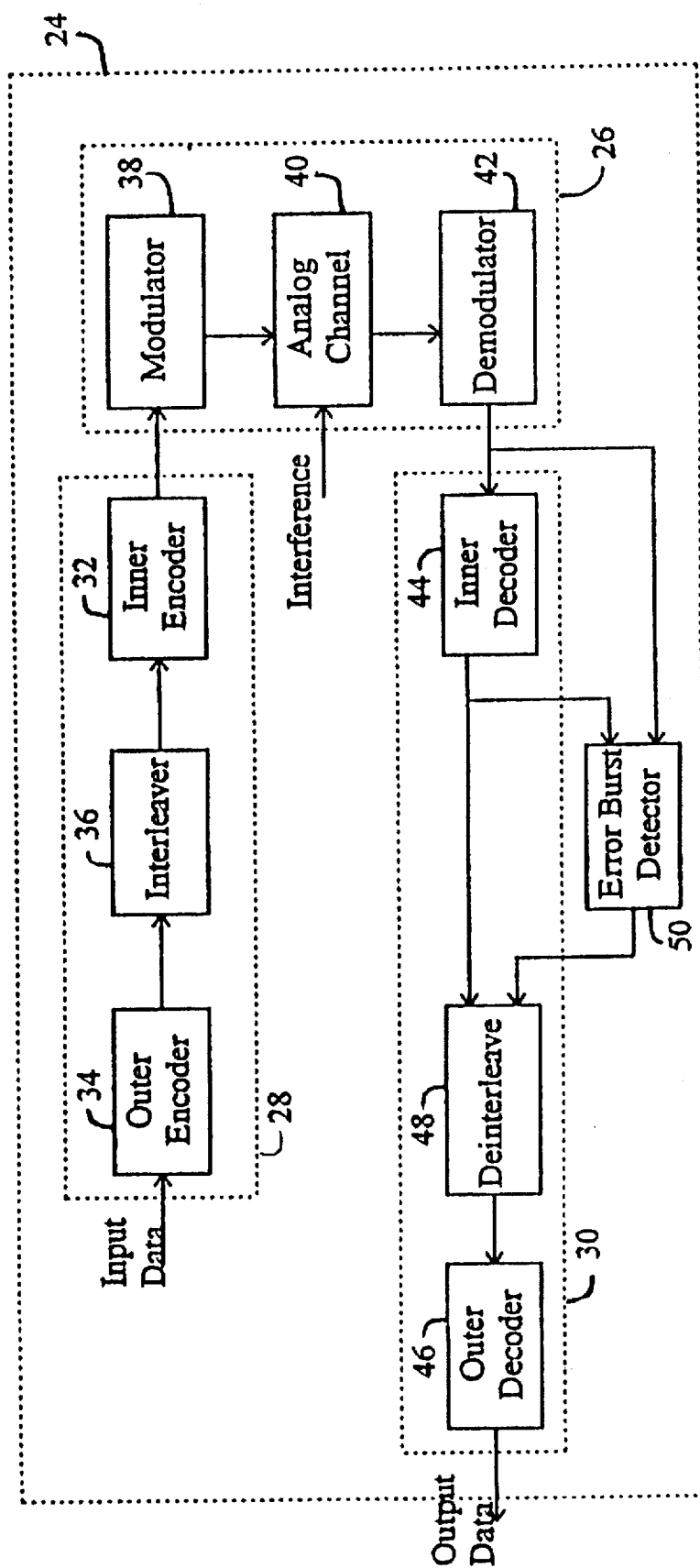
FIG. 3 is a block diagram of a digital communications system having a concatenated encoder and decoder capable of providing error correction on transmitted data.

Turning now to the drawings, FIG. 3 represents a digital communications system 24 which employs a concatenated encoding and decoding scheme. Digital communications system 24 comprises an equivalent discrete transmission channel 26 interposed between an encoder 28 and a decoder 30. Error burst detector 50 is coupled to channel 26 and decoder 30.

Digital communications system 24 in conjunction with encoder 28, decoder 30, and error burst detector 50 serves to error correct digital signals sent through channel 26. Error correction coding makes the digital signals less susceptible to noise and other forms of interference on the channel. Digital communications system 24 employs a more efficient decoder 30 which can correct a larger number of data symbol errors than conventional decoders at a comparable level of system complexity. More specifically, decoder 30 uses additional information provided by error burst detector 50 to determine the location of suspected code symbol errors and thereafter ignores code symbols in those locations upon decode. Decoder 30, in conjunction with error detector 50, is thereby capable of correcting a larger number of code symbol errors than conventional decoders. Decoder 30, in conjunction with error burst detector 50, is particularly well suited to decoding information transmitted across communications channels which are prone to random or burst errors.

Encoder 28 shown in the embodiment of FIG. 3 is a concatenated encoder. A preferred concatenated encoder hereof employs an inner, convolutional encoder 32, an outer, Reed-Solomon block encoder 34 and an interleaver 36 placed between the encoders. The input data is error correction encoded and thereafter conveyed across discrete time channel 26. Discrete time channel 26 normally comprises a modulator 38 and a demodulator 42 operably connected by an analog channel 40. Modulator 38 can use any well known modulation technique, suitable modulation being amplitude modulation, frequency shift keying, phase shift keying, etc. Whatever modulation scheme is used, the desired modulation output is one that is less susceptible to interference on channel 40.

Analog channel 40 is typically subject to interference which may corrupt signals forwarded therein. The interference may cause symbol errors at certain code word locations present at the output of demodulator 42. In digital communications system 24, analog channel 40 may take the form of a transmitting antenna from which microwaves are emitted, atmosphere and empty space through which the microwaves travel, a satellite which reflects or receives and retransmits the microwaves, and a receiving antenna which converts the microwaves into an electrical signal. In this case, the channel interference may result from atmospheric noise, multipath interference, and fading. Other forms of noise may arise from electronic circuitry within the modulator 38 and demodulator 42. Other channels which might be used in communications system 24 include cable transmission channels and magnetic recording channels.

Retrieval of a carrier modulated coded digital signal begins with demodulator 42, which serves to reproduce the coded digital signal from the carrier waveform. Depending on the modulation technique, demodulator 42 may employ an amplifier and various filters. Regardless of the form chosen, the desired output of demodulator 42 is a coded digital signal which is as free of interference as possible. However, interference cannot be entirely eliminated from the encoded signal, which consequently motivates the use of error correction coding.

According to the advantages hereof, output from demodulator 42 is forwarded to decoder 30, but also to error burst detector 50. Decoder 30 decodes the coded digital signal preferably using an inner Viterbi decoder 44, a deinterleaver 48, and an outer Reed-Solomon decoder 46. In addition, decoder 30 accepts output from error burst detector 50 which flags locations of suspected symbol errors in the coded digital signal. With the additional information provided by the determination of the symbol errors, outer decoder 46 is able to correct a larger number of symbol errors than a conventional decoder of similar complexity.

It should be emphasized that the symbol error locations must be known prior to decoding before erasures may be used to an advantage.

In systems where the prevalent error type is burst errors, the main benefit of erasures is to be gained by the outer decoder 46. The inner decoder is normally designed to correct isolated random errors. However the burst errors may only be dealt with by codes with large Hamming distances. This motivates the presence of the outer decoder in a concatenated decoder design. Since the use of erasures permits the use of codes with reduced Hamming distances, implementation complexity of the outer decoder is significantly reduced.

Figure 4:
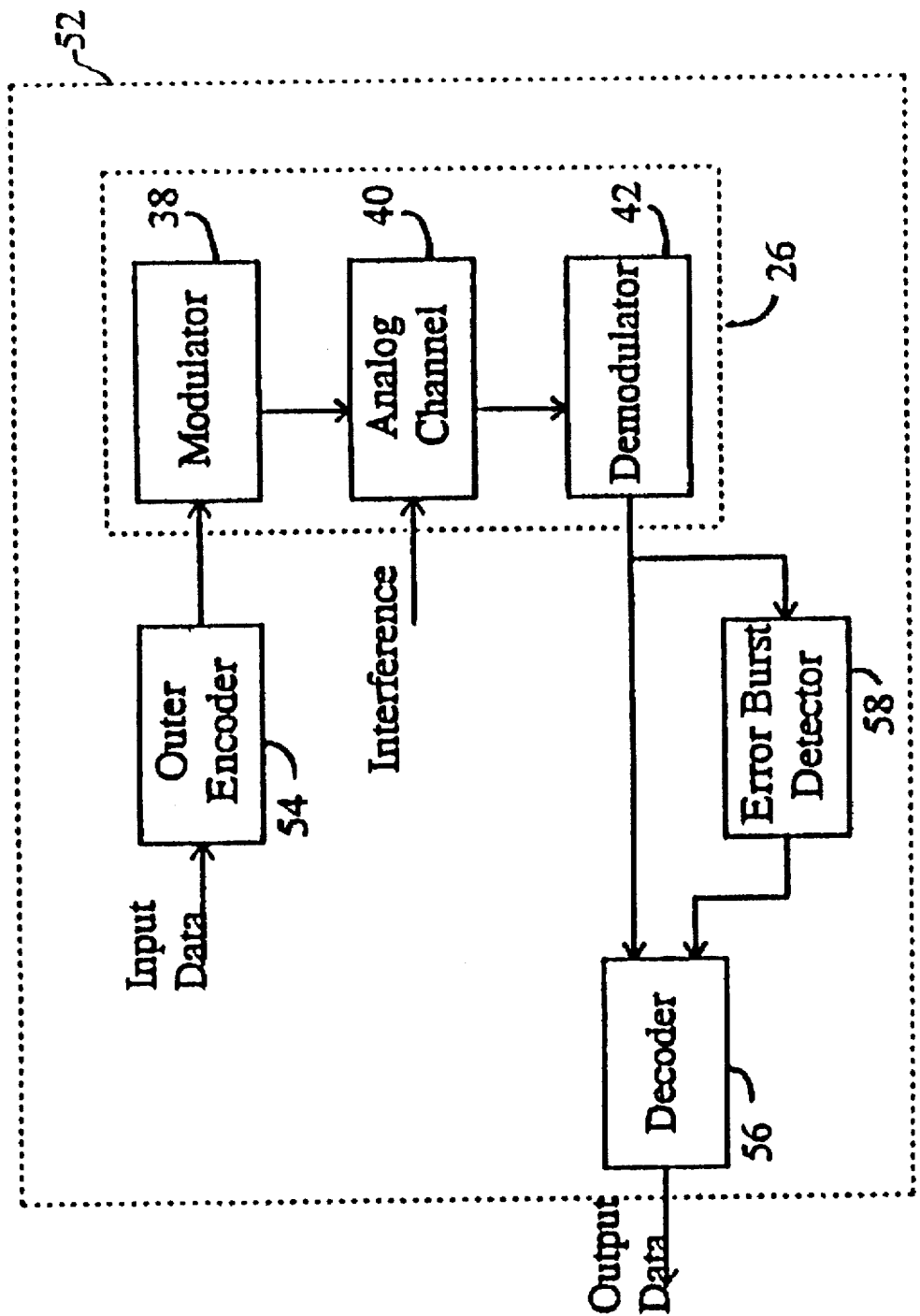
FIG. 4 is a block diagram of an alternate configuration of a digital communications system having an encoder, error burst detector, and decoder capable of providing error correction on transmitted data.

In systems where concatenated decoders are not desired, a second embodiment shown in FIG. 4 may be used. Error burst detector 58 functions to measure the noise level on discrete time channel 26 and thereafter set symbol error flags based on criteria related to the noise level. Such criteria may include the noise level or a time averaged measurement of the noise level exceeding a predetermined threshold value. Alternatively, the error burst criteria might include sudden changes in the noise level, or a combination of the value and derivative of the noise level. In any case, the symbol error locations are determined prior to decoding, and hence may be used to advantage by the entire decoder 56. Decoder 56 may be implemented in the form of a block decoder, a convolutional decoder, or a concatenated decoder.

Returning to FIG. 3, de-interleaver 48 reverses the interleave operation performed by interleaver 36. Flag information from error burst detector 50 is processed so that symbols flagged at the input to the de-interleaver 48 remain flagged at the output of the de-interleaver 48. One method for doing this is to simply add a flag bit to each symbol as it is written into a de-interleaving mechanism modified to handle the augmented symbols. Then as the augmented symbols exit the de-interleaver the flag status of a given symbol is easily determined.

Figure 5:
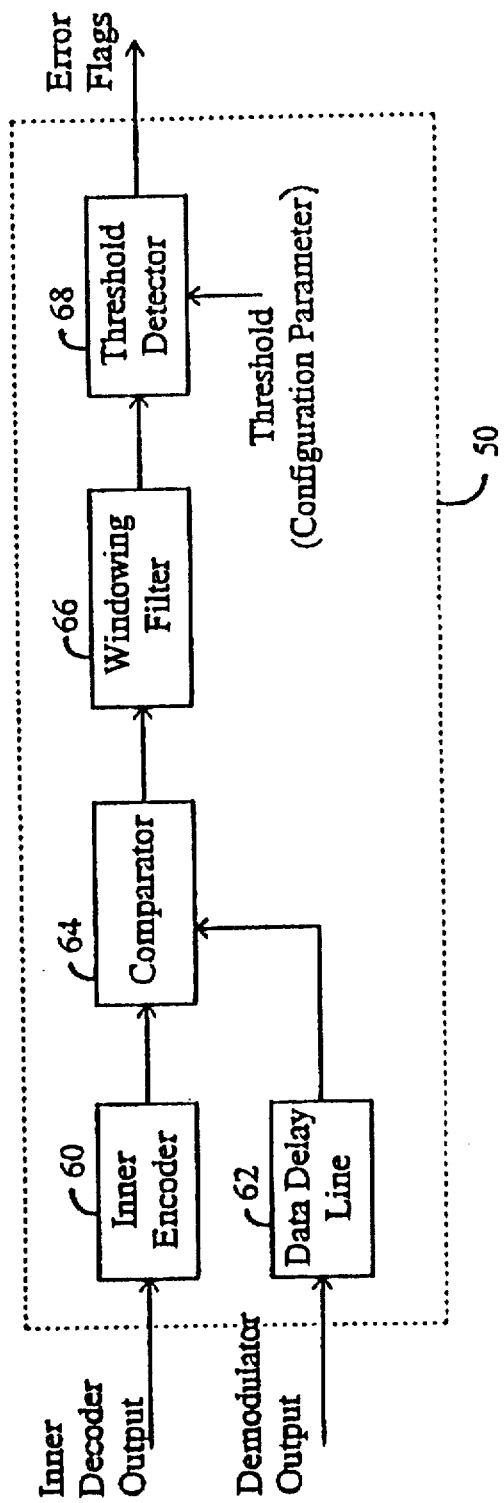
FIG. 5 is a block diagram of a possible implementation of an error burst detector suited for use in the digital communications system of FIG. 3.

As shown in FIG. 5, error burst detector 50 accepts output symbols from inner decoder 44 and re-encodes the output symbols using an inner encoder 60 which implements the same encoding function as inner encoder 32. The resulting code symbol sequence output from inner encoder 60 serves as an approximation of the input to discrete time channel 26. Location of symbol errors is easy to achieve by comparing the input to channel 26 and output from channel 26.

Although the input to channel 26 is not readily available, the approximation provided by the output of encoder 60 will be faithful when isolated random symbol errors occur. This is true since isolated random symbol errors are within the error correction capability of the inner decoder. The decoding and re-encoding of the channel output effectively implements the error correction.

The approximation of the input to discrete time channel 26 will be extremely poor when many symbol errors occur in a small amount of time (i.e. burst errors). Since the error correction capability of the inner decoder is overwhelmed by the number of errors present in a burst error, the decoding and re-encoding of the channel output effectively results in wild guesses as to the input of the channel. These guesses are wrong more often than right, but more importantly, the correspondence with actual channel output is low. This characteristic permits the identification of the portions of the channel output signal sequence in which burst errors occur. For reasons outlined later, this results in a reliable identification of symbol error locations.

Data delay line 62 serves to store the output signal from channel 26 until the inner decoder 44 and inner encoder 60 have produced an approximation of the input signal to channel 26. Comparator 64 compares the approximation of the input signal to the output signal and determines the presence or absence of a symbol error. This determination is passed in the form of a signal to a windowing filter 66 that determines the number of symbol errors in an interval which includes a predetermined number of code symbols. A signal representing this number is sent to threshold detector 68 which functions to determine whether the number of symbol errors in the specified interval exceeds a predetermined threshold. Threshold detector 68 outputs an error flag signal representing the presence or absence of a burst error in the specified interval. De-interleaver 48 is coupled to receive the error flag signal, and will use it to attach a flag bit to a subset of the code symbols that reside in the specified interval.

The windowing filter 66 serves to determine the number of symbol errors in a specified interval. This is done to identify burst errors which are characterized as many errors occurring in a localized interval. The number of errors and the size of the interval which are used to differentiate a burst error from a series of random errors are specified by the system designer based on measured channel characteristics. One implementation for filter 66 is a shift register of a specified length that stores the output of comparator 64, and a summer that sums the contents of the shift register.

The intent of the error flags is to mark as errors all of the code symbols that occur during an error burst on the basis that the symbols represent guesses by the inner decoder 44 and are most likely wrong. The probability of a particular symbol not being in error during an error burst is dependent on the statistics of the channel 26 and the decoder 30, but in general the probability is inversely proportional to the cardinality of the symbol set. For the large symbol sets normally used in Reed-Solomon codes, the probability of symbol error approaches 100%. Consequently, the erasure of these symbols is advantageous and leads to significant improvement in decoding performance of outer decoder 46.

Figure 6:
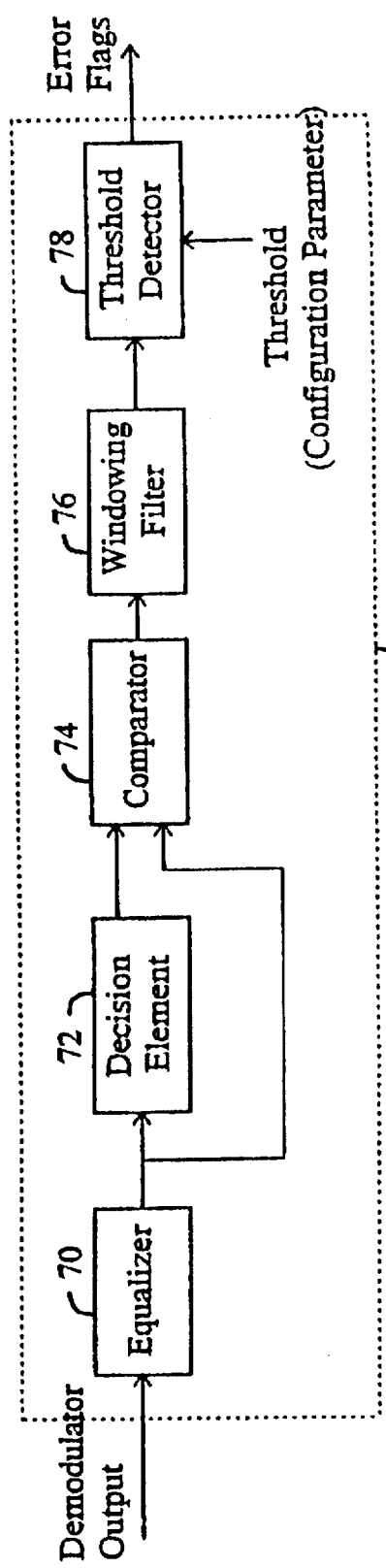
FIG. 6 is a block diagram of a possible implementation of an error burst detector suited for use in the digital communications system of FIG. 4.

FIG. 6 illustrates one possible configuration for an error burst detector 58. Error burst detector 58 comprises a decision element 72, and a comparator 74 with inputs coupled to the input and output signals of decision element 72. The output of the comparator may take the form of an absolute value of the difference between the input signals or perhaps the square of the difference between the input signals. Error detector 58 may further comprise a windowing filter 76 and a threshold detector 78. Windowing filter 76 forms a signal determined by a weighted moving average of the comparator output signal. Windowing filter 76 is designed such that the resulting signal has a significant correlation with the presence of errors in the demodulated signal stream. Threshold detector 78 asserts an error flag whenever the windowing filter output exceeds a configurable threshold. Error burst detector may additionally comprise an equalizer 70. Equalizer 70 would then serve to remove intersymbol interference from the demodulator output and/or improve the signal-to-noise ratio.

Decision element 72 may take the form of one or more comparators, each of which simply determines whether the channel output signal is greater than or less than a given value. The given values are chosen to be the midpoints between modulation points in the signal constellation. In this manner, the decision element is able to find the modulation point closest to the channel signal, and arbitrarily "decides" that the closest modulation point is the correct one. This is often referred to as making a hard decision.

The distance between the channel output signal and the correct modulation point is determined by the interference of the channel. If the channel were perfect, the channel output signal would be equal to the correct modulation point. By taking the absolute value or square of the distance, a signal representing the level of the noise on the channel is generated. This noise signal can then be processed in one of several manners. An estimated noise power can be generated by averaging a fixed number of past noise signals. It is expected that an error burst will be characterized by a sudden jump in the difference between the current and previously estimated noise power. When threshold detector 78 to detects this sudden jump, the corresponding symbol locations in the channel output have an error flag set.

Equalizer 70 is typically used to combat sources of channel interference which are not random, such as intersymbol interference. This simplifies the implementation of the decision element for complex channels and permits a more accurate estimation of noise.

The communications system configuration of FIG. 4 might generally be preferred for high-order constellations, i.e. when the signal can consist of many signal points. In this case a greater need exists for equalization to improve the receiver's ability to distinguish between signal points.

The communications system configuration of FIG. 3 might generally be preferred for channels which necessitate a large coding gain. These include power limited channels such as satellite channels are prone to a higher probability of error, and consequently require a code with a higher error correction capability.

Numerous variations and modifications will become apparent to those skilled in the art once the above disclosure is fully appreciated. It is intended that the following claims be interpreted to embrace all such variations and modifications.

What is claimed is:

1. A communications system comprising:
    an encoder configured to receive a digital signal and thereafter convert said digital signal to a coded digital signal;
    a transmission channel through which said coded digital signal is transmitted;
    a decoder coupled to said transmission channel to receive said coded digital signal, configured to correct erasures and errors in said coded digital signal, and configured to thereafter convert said coded digital signal to substantially said digital signal; and an error detector configured to provide error flags to said decoder, said error detector comprising:

a decision element coupled to receive an equalized coded digital signal and thereafter render a set of symbol decisions;

a comparator with two inputs, first of said two inputs coupled to receive said equalized coded digital signal, and the second of said two inputs coupled to receive said set of symbol decisions; said comparator configured to produce a noise signal representing an estimated noise value; and a threshold detector coupled to receive an error signal which is indicative of an error burst in said coded digital sequence if a function of said signal exceeds a threshold, and thereafter assert an error flag.

2. The communications system as recited in claim 1, wherein said decoder further comprises a de-interleaver operably coupled to the output of the transmission channel and the input of an outer decoder.

3. The communications system as recited in claim 2, wherein the output of said error detector is coupled to said de-interleaver such that said error flag remains attributed to a location in which an error appears in said coded digital signal.

4. The communications system as recited in claim 3, wherein said transmission channel capable of being a shielded cable.

5. The communications system as recited in claim 3, wherein said error detector further comprises:

a windowing filter interposed between said comparator and said threshold detector, said windowing filter configured to produce said error signal by summing a fixed number of past samples of said noise signal.

6. The communications system as recited in claim 5, wherein said error detector further comprises:

an equalizer coupled to receive said coded digital signal and thereafter produce said equalized digital signal.

7. An apparatus for detecting errors within a decoded sequence of symbols, comprising:

a decoder configured to receive a coded digital signal, configured to correct erasures and errors in said coded digital signal, and configured to thereafter convert said coded digital signal to a digital signal; and an error detector configured to provide error flags to said decoder, said error detector comprising:

a decision element coupled to receive an equalized coded digital signal and thereafter render a set of symbol decisions;

a comparator with two inputs, first of said two inputs coupled to receive said equalized coded digital signal, and the second of said two inputs coupled to receive said set of symbol decisions; said comparator configured to produce a noise signal representing an estimated noise value; and a threshold detector coupled to receive an error signal which is indicative of an error burst in said coded digital sequence if a function of said signal exceeds a threshold, and thereafter assert an error flag.

8. The apparatus as recited in claim 7, wherein said decoder further comprises a de-interleaver operably coupled to the output of the transmission channel and the input of an outer decoder.

9. The apparatus as recited in claim 8, wherein the output of said error detector is coupled to said de-interleaver such that said error flag remains attributed to a location in which an error appears in said coded digital signal.

10. The apparatus as recited in claim 9, wherein said error detector further comprises:

a windowing filter interposed between said comparator and said threshold detector, said windowing filter configured to produce said error signal by operating on said noise signal.

11. The apparatus as recited in claim 10, wherein said error detector further comprises:

an equalizer coupled to receive said coded digital signal and thereafter produce said equalized digital signal.

12. The apparatus as recited in claim 10, wherein said flag is set in each of multiple locations within a region of said coded digital signal corresponding to intervals in which values of said function of the error signal exceed said threshold.

13. The apparatus as recited in claim 12, wherein said multiple locations are adjacent within said coded digital signal prior to entry into said de-interleaver and are separated within said coded digital signal after exit from said de-interleaver.

14. The apparatus as recited in claim 13, wherein said flag may be set in multiple locations of a code word at approximately twice the quantity of erroneous symbols correctable by an apparatus absent said error detector.

* * * * *